Figure 1:
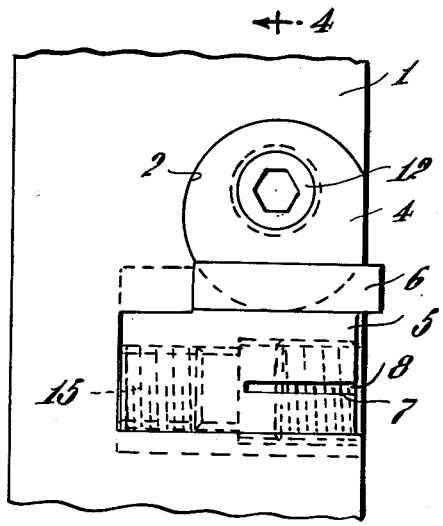

March 5, 1963

O. V. PAYNE 3,079,671

ADJUSTABLE BIT HOLDING MEANS

Filed Oct. 30, 1958

Inventor
Oscar V. Payne
by Roberts, Cushman & Grover
Attys

United States Patent Office 3,079,671
Patented Mar. 5, 1963

3,079,671
ADJUSTABLE BIT HOLDING MEANS
Oscar V. Payne, Leicester, Mass., assignor to The O.K. Tool Company, Inc., Milford, N.H., a corporation of New Hampshire
Filed Oct. 30, 1958, Ser. No. 770,648
5 Claims. (Cl. 29—96)

In the art of cutting tools, such as milling cutters for example, it is desirable to adjust the cutting bit in each of two dimensions. In the case of throw-away bits this adjustment has to be made each time the bit is shifted to a new cutting position and in the case of other bits it has to be made each time the bit is resharpened. To get a good grip on a tool bit it is necessary to have uniform pressure over all of the clamping surfaces and heretofore this has been difficult and expensive to accomplish, particularly where linear wedging or clamping means are employed.

Objects of the present invention are to provide bit-holding means which are simple and economical in construction, in which the position of the bit may be adjusted quickly and accurately in each of two dimensions, in which the bit may be clamped in position easily and firmly, in which uniform pressure is obtained automatically even though the clamping surfaces of the bit may not be parallel, and which is durable in use.

In one aspect the invention involves holding means for a tool bit comprising a locator and a clamp having bit-contacting surfaces opposite cylindrical bases which extend transversely of each other, preferably at substantially right angles. More specifically the tool comprises a holder having a recess, in the recess a locator and a clamp for gripping a bit between their front faces with their back faces abutting opposite sides of the recess, said back faces and opposite sides comprising interfitting cylindrical surfaces, the axes of the surfaces on opposite sides of the bit extending transversely of each other so that, by rotation of the parts about their axes respectively, the front faces of the parts may be aligned with the opposite sides of the bit in directions extending transversely of each other respectively.

In another aspect the tool comprises a holder having a recess with an outlet through each of two adjacent faces of the holder and, in the recess, a locator and a clamp for gripping therebetween a bit which projects from the recess beyond both of the aforesaid faces, one of the parts having a bit seat facing toward one of the outlets and the other part having a bit seat facing the other outlet, the positions of the seats determining the extent to which the bit projects through the outlets respectively, in combination with means for adjusting each of the parts transversely of its slot to vary the extent to which the pit projects through the corresponding outlet. In the preferred embodiment of the invention the two adjusting means are accessible from adjacent faces of the holder respectively, preferably the two faces beyond which the bit projects, and the adjusting means are carried by the parts.

In a more specific aspect the tool comprises two semi-cylindrical parts having opposing faces to hold a bit therebetween, the holder being recessed to fit the semi-cylindrical surfaces of the parts and one of the parts having a shoulder facing away from one of its ends on which the bottom of the bit seats, in combination with a screw extending between the holder and the aforesaid end to regulate the extent to which the bit projects from the holder, and a wedge carried by one of the parts for causing the parts to grip the bit therebetween. In the preferred embodiment the axes of the semicylindrical surfaces extend transversely of each other.

In still another aspect the tool comprises an actuator for the bit clamp and an adjustor for varying the extent to which the bit projects from the holder recess, the actuator and adjustor being carried by the same part of the clamp.

Figure 2:
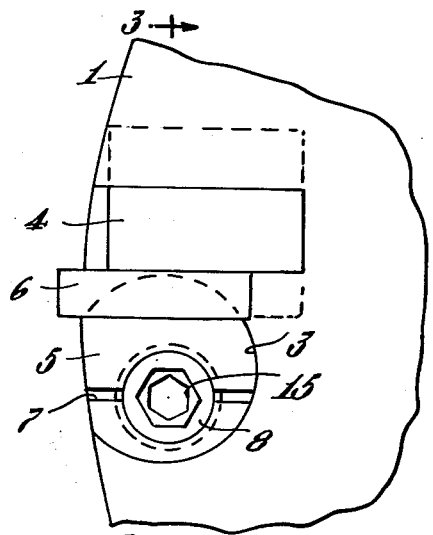
Figure 3:
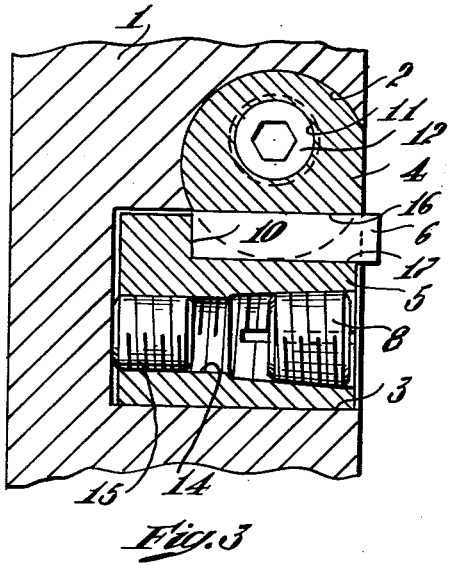
Figure 4:
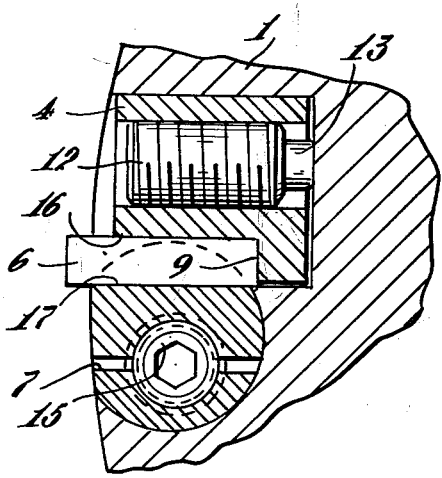
Figure 5:
Figure 6:

For the purpose of illustration a typical embodiment of the invention is shown in the accompanying drawings in which FIG. 1 is a side view of a tool holder such as a milling cutter;
FIG. 2 is an end view of the holder;
FIG. 3 is a section on line 3—3 of FIG. 2;
FIG. 4 is a section on line 4—4 of FIG. 1;
FIG. 5 is a side view of one of the clamp parts; and
FIG. 6 is an end view of the clamp part.

The particular embodiment of the invention chosen for the purpose of illustration comprises a tool holder 1 such as the head of a rotary milling cutter having a recess comprising two cylindrical portions 2 and 3, the axis of the portion 2 extending parallel to a diameter of the head and the axis of the portion 3 extending parallel to the axis of the head, the recess 2—3 opening through both the peripheral and end faces of the holder. Fitting in the two portions of the recess respectively are a locator 4 and a clamp 5 for clamping a bit 6 therebetween. The clamp 5 is split at 7 so that it may be expanded by means of a tapered screw 8 threaded into a tapered socket at the split end. The part 4 has a bit seat 9 facing the peripheral outlet of the recess 2 and the clamp 5 has a bit seat 10 facing the end outlet of the recess 3. Extending through the locator 4 parallel to its axis is a threaded bore 11 for a screw 12 having an inner end 13 of reduced dimension. Extending through the clamp 5 is a similar threaded bore 14 which is in line with the recess for screw 8. Threaded into the bore 14 is a screw 15 having a recess in its outer end for a screw driver. Adjacent the bit seats 9 and 10 the parts 4 and 5 have flat faces 16 and 17 for engagement with opposite sides of the bit 6.

To assemble the parts the screw 8 is removed and each of the screws 12 and 15 is retracted. Then each of the parts 4 and 5 is slipped into its recess lengthwise of its axis after which the bit 6 is inserted against the seats 9 and 10. By advancing the screw 12 the locator 4 is pushed outwardly to cause the bit 6 to project the desired distance beyond the periphery of the head, and by advancing the screw 15 the clamp 5 is pushed outwardly to cause the bit 6 to project the desired distance beyond the end face of the holder 1. After the bit has been properly adjusted the screw 8 is inserted and tightened to clamp the bit between the two parts 4 and 5.

From the foregoing it will be evident that this bit-holding means is simple and economical in construction, the bit may be adjusted quickly and accurately in each of two dimensions, and the bit may be clamped easily and firmly in position.

It should be understood that the present disclosure is for the purpose of illustration only and that this invention includes all modifications and equivalents which fall within th scope of the appended claims.

I claim:

1. A tool comprising a holder having first and second cylindrical recesses extending transversely of each other in intersecting relationship, a locator having a cylindrical surface fitting the first recess and a bit-holding surface facing the second recess, a clamp having a cylindrical surface fitting the second recess and a bit-holding surface facing the first recess, and means to force the bit-holding surface of the clamp toward the bit-holding surface of the locator to clamp a bit therebetween.

2. A tool according to claim 1 in which the clamp has a bit-seating shoulder extending transversely of the axis of the clamp and means for adjusting the clamp longitudinally of its axis.

3. A tool comprising a holder having first and second cylindrical recesses extending transversely of each other in intersecting relationship with outlets through adjacent faces of the holder respectively, a locator having a cylindrical surface fitting the first recess and a bit-holding surface facing the second recess, a clamp having a cylindrical surface fitting the second recess and a bit-holding surface facing the first recess, the locator having a bit-seating surface facing said outlet of the first recess, the clamp having a bit-seating surface facing said outlet of the second recess, and adjusting means to shift the locator and clamp longitudinally of their axes respectively.

4. Adjustable bit clamping means comprising a holder having a recess with an outlet through each of two adjacent faces of the holder, in the recess a clamp including two parts having a bit space therebetween, one of the parts having a bit seat at one side of said space facing one of said outlets and the other part having a bit seat extending transversely of said seat and facing the other outlet, and means for adjusting each of the parts transversely of its seat.

5. Adjustable bit clamping means according to claim 4 further characterized in that said means are accessible from said adjacent faces respectively.

References Cited in the file of this patent

UNITED STATES PATENTS

| | | |
|---|---|---|
| 2,458,946 | Johnston | Jan. 11, 1949 |
| 2,664,617 | Kralowetz | Jan. 5, 1954 |
| 2,751,663 | Leuzinger | June 26, 1956 |
| 2,859,507 | Knell | Nov. 11, 1958 |

FOREIGN PATENTS

| | | |
|---|---|---|
| 1,130,068 | France | Sept. 17, 1956 |